Dec. 22, 1942.          E. W. VOSE          2,306,096
AIRCRAFT PROPELLER
Filed Nov. 5, 1938          2 Sheets-Sheet 1
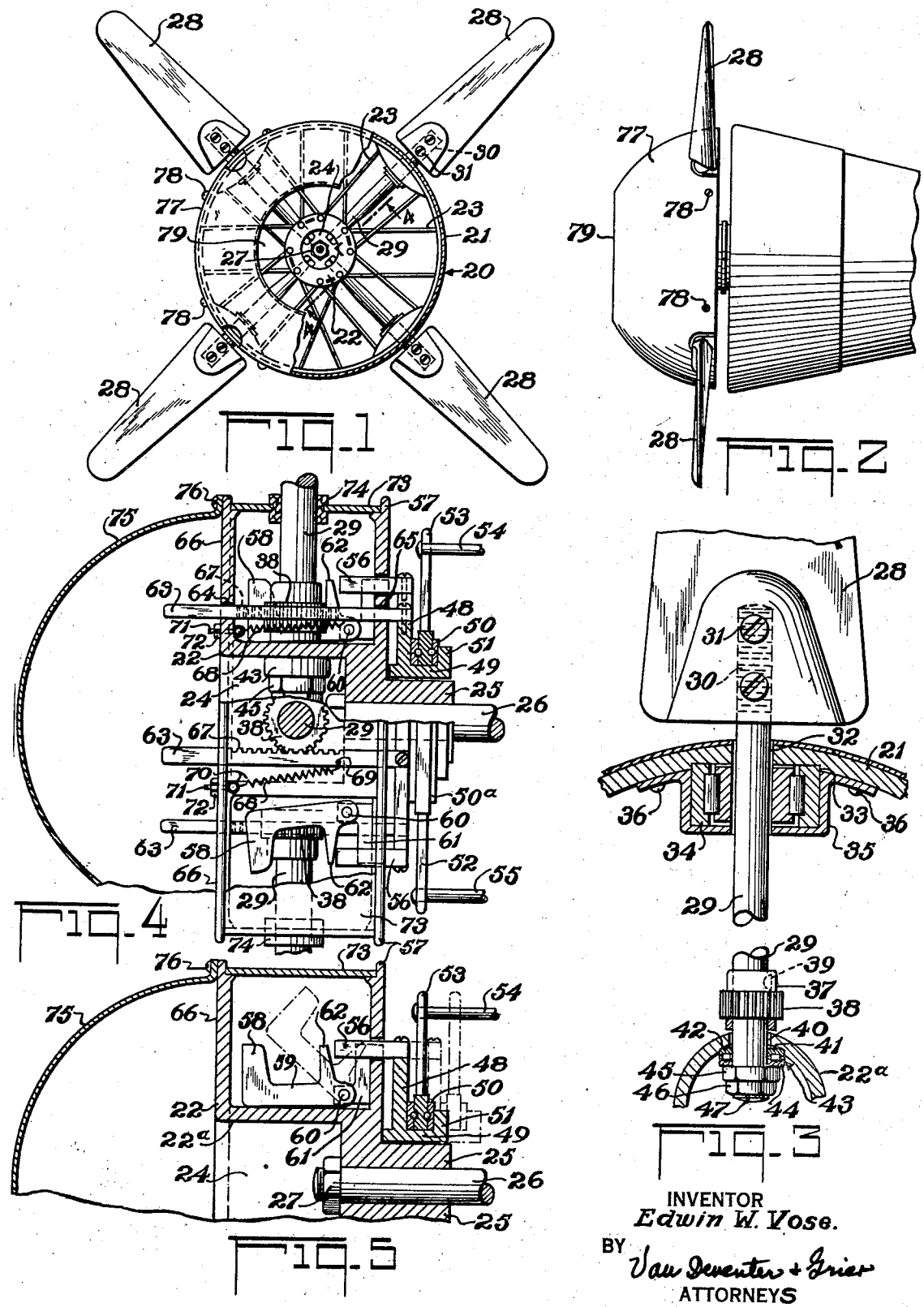
INVENTOR
Edwin W. Vose.
BY
Van Deventer + Grier
ATTORNEYS Dec. 22, 1942.  E. W. VOSE  2,306,096
AIRCRAFT PROPELLER
Filed Nov. 5, 1938  2 Sheets-Sheet 2

INVENTOR
Edwin W. Vose.
BY
Van Deventer & Grier
ATTORNEYS

Patented Dec. 22, 1942

2,306,096

UNITED STATES PATENT OFFICE 2,306,096

AIRCRAFT PROPELLER

Edwin W. Vose, Orange, N. J., assignor of thirty-eight and two-tenths per cent to the Estate of Henry D. Walbridge, deceased, late of New York, N. Y.

Application November 5, 1938, Serial No. 238,987

6 Claims. (Cl. 170—163)

This invention relates to improvements in aircraft propellers and has for a main object the provision of a variable pitch propeller in which the pitch of its blades is automatically varied so as to maintain the motor which drives the propeller at its most efficient speed at varying speeds of an aircraft propelled thereby.

Another object of the invention is the provision of an improved centrifugally operable variable pitch propeller including simple mechanism for varying the pitch in accordance with the speed of rotation, said mechanism also including means independent of the speed for changing said pitch.

A further object of the invention is the provision in an aircraft propeller of novel means for supporting the blades of the propeller on a driving motor.

Another object of the invention is the provision in an aircraft propeller structure, of a zone about the center of the propeller in which cooling air is admitted to the driving motor.

Still another object of the invention is the provision in an aircraft propeller of a zone about the center of the propeller carrying impeller blades which furnish cooling air to the driving motor.

A further object of the invention is the provision in an aircraft propeller of a wheel-like structure carrying bearings in its hub and bearings in line therewith in its rim for journalling shafts carrying the propeller blades, and the further provision of a centrifugally controlled mechanism for varying the pitch of said blades.

Another object of the invention is the provision in a variable pitch aircraft propeller structure of a wheel-like supporting structure for the shafts of the blades having a hub and a rim conjointly journalling shafts carrying said blades, the provision of a streamlined casing supported on said wheel-like structure, said streamlined casing matching the casing of the motor and having a central opening to permit cooling air to pass to the motor.

Other objects will be apparent to those skilled in the art.

Referring to the drawings which illustrate one embodiment of the invention:

Figure 1 is a front elevation of the new and improved aircraft propeller;

Figure 2 is a side elevation of the new propeller and its relation to a cowling enclosing the motor;

Figure 3 is a detailed view, partly in section, showing one method of mounting the propeller blade shafts;

Figure 4 is an elevation, partly in section, of the hub portion of the propeller blade support showing details of the mechanism for varying the pitch of the propellers;

Figure 5 is a sectional view showing the action of the centrifugal weights;

Figure 6:
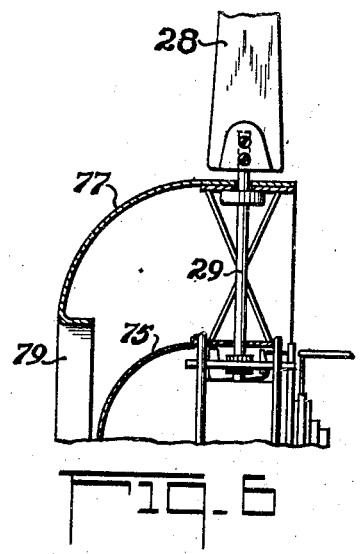
Figure 6 is a fragmentary view, partly in section.

A support generally designated by the numeral 20 consists of a rim member 21, a hub member 22 and a plurality of spokes 23 which together form a wheel-like structure. The hub 22 has a hollow 24 extending therein from the front side as viewed in Figure 1, and has a rearwardly extending portion or hub extension 25 which may be seen in Figure 4. The shaft 26 of the motor carries the hub 22, the latter being secured thereto by suitable keyways, not shown, and retained on said shaft by means of the nut 27 suitably locked so as not to be loosened by vibration.

The propeller blades 28 are foreshortened and extend from their tips to a point clearing the rim 21. Each propeller blade 28 is provided with a shaft 29 the center line of which is preferably in line with the face of the blade.

The shaft 29 may be rigidly secured to the blade 28 in any suitable manner, for example, by screwing the threaded end of the shaft 30 into the blade and then securing the same by means of a rivet 31.

The rim 21 which is substantially spaced apart from the hub 22 carries a plurality of bearings for supporting the outer ends of the propeller shafts. One method of supporting the bearings in the rim is illustrated in Figure 3. A hole 32 in the rim 21 clears the shaft 29. The hole 32 is counter-bored from inside the rim of the diameter of the bearing. The counter-bored hole is designated by the numeral 33 and a suitable bearing 34 which may be a roller bearing, fits into the counter-bored hole and fits on the shaft 29. A cup-like member 35 fits the outer diameter of the bearing 34 and may be secured to the rim 21 by means of rivets 36. Extending downwardly from the bearing 34 shown in Figure 3, the shaft 29 tapers slightly and has a shoulder formed therein adjacent to the hub 37 of the pinion 38. A suitable keyway 39 maintains the pinion 38 in fixed relation to the shaft 29 and suitable means, not shown in the drawing, may be provided for securing the pinion 38 positively to the shaft 29.

The annular portion 22ᵃ of the hub 22 has a clearance hole 40 formed therein clearing the portion of the shaft 29 extending downwardly from the pinion 38. Reinforcing sector 41 has a hole formed therein matching the clearance hole 40 and this member 41 when positioned within the hub 22 forms a reinforcing backing for the stationary member 42 of the thrust bearing 43. Stationary member 42 may be secured against rotation within the hub 22 in any suitable manner. The rotatable portion 44 of the thrust bearing 43 may be secured in fixed relation to the lower end of the shaft 29 in any suitable manner and may be maintained in said fixed relation by means of nut 45 and a lock nut 46 screwed on to the threaded end 47 of the shaft 29. From this structure it may be seen that the shafts 29 carrying the propeller blades 28 are journalled in bearings spaced apart from each other the distance between the hub and the rim of the wheel-like structure 20. The outer bearing 34 takes care of the lateral thrust and the inner bearing 43 takes care of the longitudinal thrust due to the centrifugal effect of the highly rotating propeller blade.

Although the thrust bearings 34 and 43 are shown as simple roller thrust bearings, it is obvious that various types of special thrust bearings may be employed whether they be single or compound types.

A flange 48 having a hub 49 journalled on the hub extension 25 is provided with a double throw annular thrust bearing 50. The thrust bearing 50 may be secured to the hub by means of an annular ring 51 which may be screwed on to the hub and permanently riveted on after assembly.

A portion 50ᵃ of the thrust bearing 50 may be provided with extending rods 52 and 53 which may be connected to a manual control, not shown, by mechanism including rods 54 and 55. The flange 48 carries a plurality of bars 56 which form working fits with openings formed in the web 57 of the hub 22.

A plurality of weights 58, one of which is shown in detail in Figure 5, are each carried on a lever 59, each lever being pivotally mounted on a pivot shaft 60 supported by suitable lugs one of which is designated by the numeral 61 carried on the annular portion 22ᵃ of the hub 22. Each lever 59 is provided with an extending arm 62 adapted to act against the end of the bar 56 so that as the propeller speeds up the weights 58 fly out and the lever portions 62 act against the ends of the bars 56 and thereby move the flange 48 to the right as shown in Figure 5.

A bar 63 is slidably journalled in holes 64, 65, formed in the webs 66 and 57. The bar 63 has teeth 67 formed therein meshing with the pinion 38. The bar 63, as above stated, is slidably journalled in the webs 66 and 57, and has one end thereof secured to the flange 48 so that as the propeller speeds up the weights 58 fly out and the lever portions 62 act against the ends of the bars 56, thereby moving the flange 48 to the right, as shown in Figure 5, and due to the fact that the bar 63 is secured to the flange 48, the movement of the latter causes the rack teeth 67 on the bar to cause the propeller blade shaft 29 to rotate, thereby changing the pitch of the blades.

In the embodiment herein shown and described, there are four propeller blades and, therefore, there are four bars 63 carrying racks 67, each being associated with a pinion 38 on the respective propeller blade shafts 29.

As the horse-power of aircraft motors is being increased, larger propellers are required for these motors. However, in the prior art the practical limit for the number of blades in an aircraft propeller appears to be three blades; therefore, in order to properly load the motor, it would appear that with propellers of the prior art the only thing left to do is to increase the diameter of the propeller. When the diameter of the propeller is increased, the areas between the blades are increased, thereby providing space in which other blades could properly function, but the nature of propellers of the prior art is such that extra blades may not be added without undue complications (if at all).

In propellers employing the new and improved wheel-like structure herein shown and described, the use of any desired number of blades is facilitated without complicating the automatic control feature or the general structure; therefore, the new and improved propeller, due to this important feature, will permit the use of larger and more powerful motors without increasing the diameter of the propeller in direct proportion to the increase of the power of the motor. In other words, as the propeller becomes larger in diameter, more blades may be added without increasing the interference between the blades, and propellers of my new and improved type may conceivably have more than four blades for use on larger engines if, as and when the same are developed.

In order that the weights 58 return to their normal positions when the propeller is stopped, or returned to their normal positions when the propeller is slowed down, suitable springs, one of which is shown in Figure 4 and designated by the numeral 68, are provided. The spring 68 has one end secured to the bar at the point 69, and the other end secured to the eye 70 of an eye-bolt 71, and a suitable nut 72 is provided for adjusting the tension of the spring 68. The purpose in having the springs 68 adjustable is in order that the propeller when the same is mounted on an engine shaft may be properly tuned to the engine in order to make the combination of the propeller and the engine an efficiently operable unit. The spring resistance is set so that the pitch angle of the propeller blade changes at the proper points of speed of the engine rotation. These springs, through the medium of the bars 63, urge the flange 48 to the left, as viewed in Figure 4, and this urge is in turn transmitted to the weights 58 through the medium of the bars 56 and the arms 62. Although the springs 68 are shown as associated with the bars 63, it will be obvious to those skilled in the art that these springs could be applied directly to the weights themselves, or a single spring could surround the shaft 26 and the hub 25 and bear against the annular ring 51 and thereby urge the flange 48 to the left with the same result.

The flanges or webs 57 and 66 have their adjacent faces shouldered to form a support for a closure member 73 which may be made in any suitable manner and secured to the webs in any suitable manner for completely enclosing the weights 58 and the active portions of the bars 56 and 63. The shafts 29 pass through openings formed in the closure member 73 and felt packing rings 74 are provided between each shaft and the closure member 73 to prevent egress of lubricant or the ingress of dust or other foreign matter.

A dome-shaped hub shield 75 closes the projecting ends of the bar 63 and also encloses the inner thrust bearing 43 to protect them from dust, dirt and other foreign matter. This shield may be secured to the web 66 in any suitable manner, such, for example, as by screws 76.

A cowling 77 may be secured to the rim member 21 in any suitable manner, for example by screws 78. This cowling is curvilinear in form and has a central opening 79 through which air may pass to the motor when the plane is in motion. This cowling may be seen in elevation in Figure 2 and in cross section in Figures 6 to 8, and is of such form as to present a smooth curvilinear surface over which air deflected to the propeller blades and due to the absence of blade portions in active areas near the hub, the new and improved propeller herein described performs with a minimum of noise.

The path of the air leading to the motor when the plane is in motion is via the opening 79 and defined between the interior surface of the cowling 77 and the exterior surface of the shield 75.

In cases where it is necessary for the plane to taxi out to a position before taking off—and this is particularly true with sea-planes—the amount of air which passes over the motor, due to the slow taxi motion of the plane with the wind, is not sufficient to cool the motor below the danger point. This difficulty is eliminated in the arrangement shown in Figures 7 to 9.

Figure 7:
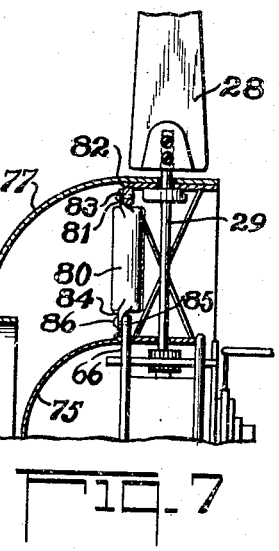
Figure 7 is a view similar to Figure 6, with the exception that impeller blades for impelling cooling air are fixedly mounted in the wheel-like supporting structure.

Referring now to Figure 7, a plurality of impeller blades, one of which is designated by the numeral 80, are provided for furnishing a forced draft of air to the motor. The impeller blade 80 has a lug 81 formed at one end thereof which may be secured to a lug extension 82 carried by or formed integral with the rim 21, by any suitable means, for example, by means of a rivet or rivets 83. The lower end of the impeller blade 80 is also provided with a lug 84 which may be secured to a lug extension 85 carried by or formed integral with the web 66 by means of a rivet or rivets 86.

Although it may be preferable to provide one impeller blade for each propeller blade 28, it is obvious that as many or as few impeller blades 80 may be used in accordance with the type of work in which the new and improved propeller is used. The pitch of the impeller blade should preferably be steeper than that of the propeller blade so that when the propeller blade is at a minimum pitch, the impeller blade will be at an efficient pitch for supplying air to the motor.

Figure 8:
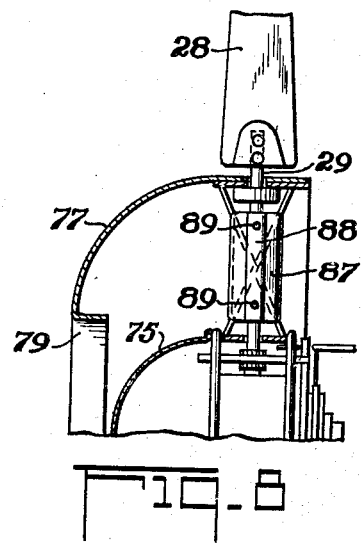
Figure 8 is a sectional elevation, similar to Figure 7, except that the impeller blades are shown as mounted on the propeller blade shafts so as to vary their pitch in accordance with the variation of the pitch of the propeller blades.
Figure 9:
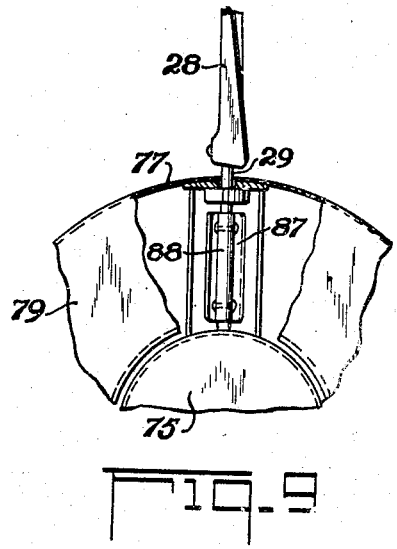
Figure 9 is a face view of a portion of the arrangement shown in Figure 8.

In the embodiment shown in Figures 8 and 9, the propeller blade shafts 29 each carry an impeller blade so that the pitch of the impeller blades vary in a definite ratio with the pitch of the propeller blades. In order to accomplish this, the propeller blades, one of which is illustrated in Figures 8 and 9, and designated by the numeral 87, is provided with a rib 88 of suitable form and having formed therein a hole fitting the shaft 29. The impeller blade 87 may be secured to the shaft 29 in any suitable manner, for example by means of rivets 89. The pitch relation between the propeller and the impeller blades is such that when the propeller is rotating at a minimum pitch, the impeller blades are at a pitch suitable to supply cooling air to the motor at an efficient rate. As the propeller speeds up, the propeller blades have their pitch changed through the medium of the weights 55, the bars 56, the flange 48, the bars 63, the racks 67, and the pinions 38. The shaft 29 in rotating the propeller blades 28 to change the pitch to an efficient pitch, also moves the impeller blades to a maximum pitch position neutral to the air stream which is desirable because the motion of the aircraft while flying through the air causes sufficient air to pass into the opening 79 and thence about the motor, and because substantially no power is used to drive the impeller blades when the aircraft is in flight.

Although the invention has been disclosed and described in connection with the specific details of preferred embodiments thereof, it must be understood that such details are shown by way of example only and are not intended to be limitative of the invention except in so far as set forth in the appended claims.

What is claimed is:

1. In an aircraft propeller, a hub having a portion adapted for attachment to a driving motor and a hollow portion adjacent to said first portion, a plurality of parallel flanges extending radially from said hub, a propeller blade, a shaft secured to said blade, a bearing for said shaft supported in said hub, a second bearing for said shaft carried in a supporting member in parallel and spaced relation with said first bearing, said bearings forming pivotal supports for said shaft, a pinion secured to said shaft and positioned between said bearings, a rack slidably journaled in said flanges and having teeth meshing with said pinion, a plate member slidably supported adjacent to one of said flanges and adapted to be moved on an axis coinciding with the axis of said hub, said rack being connected to and adapted to be moved axially by said plate member, speed-responsive means for moving said plate along its axis and thereby tending to change the pitch of said blade by rotating said shaft through the medium of said rack and pinion, resilient means yieldably resisting the movement of said plate for preventing the variation of the pitch of said blade until a predetermined speed of rotation has been attained by said propeller.

2. In an aircraft including an engine, a propeller driven by said engine including a rotatively adjustable blade, a shaft secured to and having its center line in line with one face of said blade, a hub mounted on said engine, an annular ring shaped member larger in diameter than and surrounding said hub, a plurality of spokes holding said ring shaped member rigidly in concentric relation to said hub, bearing means in said hub and in said ring shaped member forming spaced supports for said shaft along a radial line cutting the axis of said engine, centrifugal apparatus associated with said shaft for increasing the pitch of said blade, mechanism yieldably urging said blade toward its minimum pitch position and for holding said blade against movement from its minimum pitch position until a predetermined speed of said engine is attained, a plate member movable axially with respect to said means, connections between said plate and said mechanism, and manually controlled means for moving said plate and independently changing the pitch of said blade.

3. In an aircraft propeller, a wheel-like structure having a hub, a portion of which is adapted for attachment to a driving motor and a hollow portion adjacent to said first portion, an annular rim-like portion and a plurality of spokes for rigidly supporting said rim-like portion in rigid relation to said hub, a plurality of propeller blades, a shaft for each blade, means securing said blades and associated shafts together, a set of thrust bearings for each shaft comprising an axial thrust bearing means supported in said hub and radial thrust bearing means supported in said rim, a pinion for each shaft secured thereto in a position between said thrust bearing means, a rack for each of said pinions slidably supported by said hub and adapted to be moved along a line parallel to the axis of said hub, each of said racks having teeth meshing with one of said pinions, an axially slidable member common to and in fixed relation with all of said racks, speed-responsive means for moving said member along its axis and adapted through the medium of said racks and said pinions to change the pitch of said blades by rotating said shafts, and resilient means yieldably resisting the movement of said member for preventing a variation of the pitch of said blade until a predetermined speed of rotation has been attained by said propeller.

4. In an aircraft including an engine, a propeller driven by said engine including a rotatively adjustable blade, a shaft secured to said blade, a hollow hub carried on said engine, a bearing in said hub for pivotally supporting said shaft at its inner end, an annular member substantially larger in diameter than and surrounding said hub, a plurality of spokes supporting said member about said hub, a bearing in said annular member also supporting said shaft, both said bearings being in alignment and radially spaced apart from the axis of said hub, said spokes being angular with respect to the radial axis of said shaft, centrifugal apparatus associated with said shaft for increasing the pitch of said blade, and mechanism yieldably urging said blade toward its minimum pitch position and for holding said blade against movement from its minimum pitch position until a predetermined speed of said engine is attained.

5. In an aircraft propeller, a hub structure, an annulus in concentric spaced relation to said hub structure, a plurality of spokes rigidly supporting said annulus on said hub, a plurality of blades, each of said blades having a supporting shaft, said spokes being angularly disposed with respect to said shafts and greater in number than said shafts, a plurality of sets of bearings for rotatably supporting said shafts, each set including a bearing carried in said hub structure and a second bearing in alignment therewith carried in said annulus structure whereby said blades may be adjusted rotatably by means of said shafts, mechanism between said hub structure and said annulus for increasing the pitch of said blades, said mechanism including means rotatably engaging said shafts, and means associated with said mechanism for yieldably resisting the rotation of said shafts and the increase of the pitch of said blades until the speed of rotation of said propeller reaches a predetermined value.

6. In an aircraft propeller, a wheel-like structure including a hub portion and a rim portion with spokes therebetween for rigidly supporting the latter on said hub portion, a propeller blade, said blade having a shaft secured thereto to form a support therefor, a bearing for said shaft carried in said hub portion, a second bearing for said shaft carried in radial alignment with said first bearing and angular with the axis of said hub portion by said rim portion, a speed-responsive mechanism supported on said hub portion and positioned between said hub portion and said rim portion for rotating said shaft to increase the pitch of said blade, and adjustable resilient means associated with said mechanism for yieldably resisting the action of said mechanism until a desired speed of rotation of said propeller is attained.

EDWIN W. VOSE.